(12) United States Patent
Poy

(10) Patent No.: US 10,710,165 B2
(45) Date of Patent: Jul. 14, 2020

(54) METAL CUTTING TOOL HOLDER COMPRISING FLUID PASSAGES

(71) Applicant: SANDVIK INTELLECTUAL PROPERTY AB, Sandviken (SE)

(72) Inventor: Gerd Poy, Besigheim (DE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/068,923

(22) PCT Filed: Dec. 19, 2016

(86) PCT No.: PCT/EP2016/081641
  § 371 (c)(1),
  (2) Date: Jul. 10, 2018

(87) PCT Pub. No.: WO2017/125220
  PCT Pub. Date: Jul. 27, 2017

(65) Prior Publication Data
  US 2019/0009344 A1    Jan. 10, 2019

(30) Foreign Application Priority Data
  Jan. 18, 2016  (EP) .................................... 16151678

(51) Int. Cl.
  *B23B 27/10*   (2006.01)
  *B23B 29/12*   (2006.01)
  (Continued)

(52) U.S. Cl.
  CPC .............. *B23B 27/10* (2013.01); *B23B 29/12* (2013.01); *B23B 2250/12* (2013.01); *B23Q 11/10* (2013.01); *Y10T 407/14* (2015.01)

(58) Field of Classification Search
  CPC ..... B23B 27/10; B23B 29/12; B23B 2250/12; Y10T 407/14; B23C 5/08; B23C 5/28; B23Q 11/10
  See application file for complete search history.

(56) References Cited

U.S. PATENT DOCUMENTS 5,272,945 A    12/1993  Lockard
5,340,242 A *   8/1994  Armbrust ................ B23B 25/02
                                                    407/11
(Continued)

FOREIGN PATENT DOCUMENTS

DE      19654010 A1    7/1998
JP      H02104903 U    8/1990
(Continued)

*Primary Examiner* — Sara Addisu
(74) *Attorney, Agent, or Firm* — Corinne R. Gorski

(57) ABSTRACT

A metal cutting tool holder includes a tool holder body having a first fluid passage extending in a first direction between a first inlet and a first outlet, and a second fluid passage extending in a different second direction between a second inlet and a second outlet. The tool holder body has a cavity and the first outlet and the second inlet intersect the cavity. A member is positionable in the cavity such that a curved third fluid passage connecting the first outlet and the second inlet is formed at least partially by the member. The curved third fluid passage extends from a first end adjacent to the first outlet to a second end adjacent to the second inlet. The first direction is tangent to the curved third fluid passage at the first end, and the second direction is tangent to the curved third fluid passage at the second end.

15 Claims, 7 Drawing Sheets

(51) Int. Cl.
*B23C 5/28* (2006.01)
*B23Q 11/10* (2006.01)

(56) References Cited

U.S. PATENT DOCUMENTS

| | | | |
|---|---|---|---|
| 8,696,253 B2 * | 4/2014 | Amstibovitsky | B23B 27/10 407/11 |
| 10,052,694 B2 * | 8/2018 | Musil | B23B 27/10 |
| 2002/0127067 A1 * | 9/2002 | Lagerberg | B23B 29/046 407/11 |
| 2008/0124180 A1 * | 5/2008 | Breisch | B23B 27/10 407/110 |
| 2008/0131215 A1 * | 6/2008 | Sjoo | B23B 27/04 407/110 |
| 2010/0196105 A1 * | 8/2010 | Amstibovitsky | B23B 27/10 407/11 |
| 2012/0082518 A1 * | 4/2012 | Woodruff | B23C 5/109 407/11 |
| 2012/0230780 A1 * | 9/2012 | Henry | B23B 27/10 407/11 |
| 2014/0133924 A1 | 5/2014 | Oren et al. | |
| 2014/0270999 A1 * | 9/2014 | Huang | B23B 27/10 407/11 |
| 2015/0273589 A1 * | 10/2015 | Hoffer | B23B 27/10 407/11 |
| 2015/0352640 A1 | 12/2015 | Frota De Souza Filho et al. | |
| 2016/0136733 A1 * | 5/2016 | Kaufmann | B23B 29/043 407/11 |
| 2019/0001454 A1 * | 1/2019 | Huang | B23B 27/10 |
| 2019/0015904 A1 * | 1/2019 | Kobayashi | B23B 27/10 |

FOREIGN PATENT DOCUMENTS

| | | | | |
|---|---|---|---|---|
| JP | H0825111 A | | 1/1996 | |
| JP | 10076404 A | * | 3/1998 | B23B 27/10 |
| JP | H11291101 A | | 10/1999 | |
| JP | 2006218549 A | | 8/2006 | |

* cited by examiner

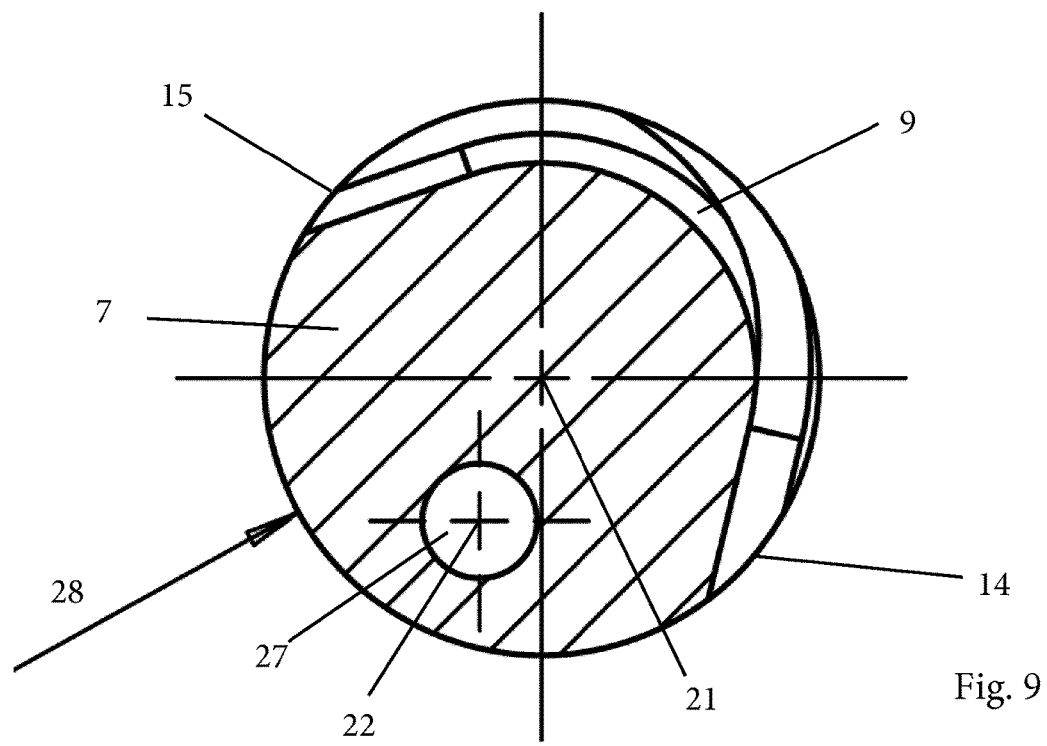
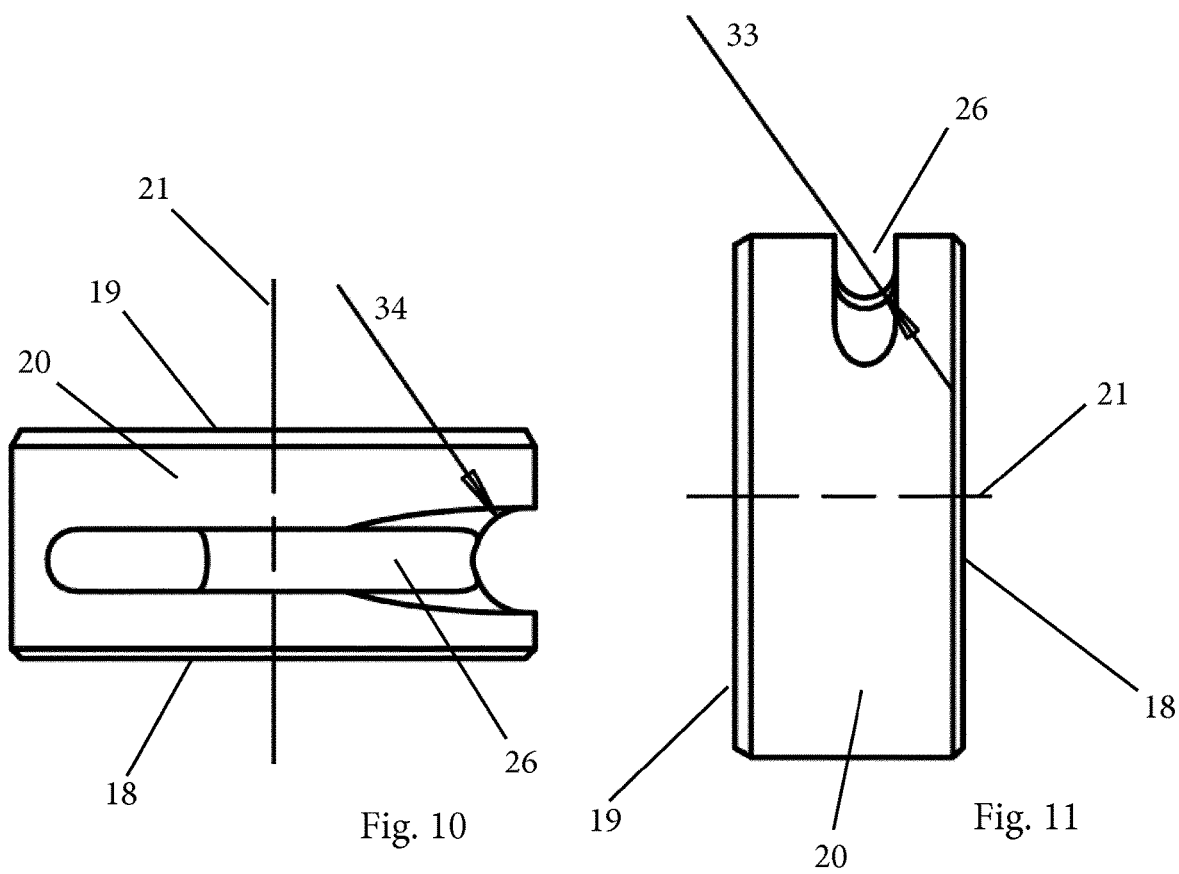
Fig. 9
Fig. 10
Fig. 11

METAL CUTTING TOOL HOLDER COMPRISING FLUID PASSAGES

RELATED APPLICATION DATA

This application is a § 371 National Stage Application of PCT International Application No. PCT/EP2016/081641 filed Dec. 19, 2016 claiming priority to EP 16151678.6 filed Jan. 18, 2016.

TECHNICAL FIELD OF THE INVENTION

The present invention belongs to the technical field of metal cutting. More specifically the present invention belongs to the field of metal cutting tool holders used for metal cutting in machines such as computer numerical control, i.e. CNC, machines.

BACKGROUND OF THE INVENTION AND PRIOR ART

The present invention refers to a metal cutting tool holder having a tool holder body, the tool holder body comprising a first fluid passage extending in a first direction between a first inlet and a first outlet, and a second fluid passage extending in a second direction between a second inlet and a second outlet, wherein the first direction is different from the second direction, the tool holder body comprises a cavity, the first outlet and the second inlet intersect the cavity, and the first outlet and the second inlet are spaced apart. In a second aspect, the present invention relates to a method to machine a metal work piece by means of such metal cutting tool holder.

In metal cutting, it is common to use a fluid which is directed to a cutting zone, i.e. to the cutting edge which cuts chips from a metal work piece which is machined, or to the vicinity thereof. This is in contrast to so called dry machining, where no fluid is used. The fluid is supplied through a channel or passage from a fluid source to the cutting zone. Depending on the type of operation, work piece material and other factors, the effect of the fluid varies. Especially in turning, fluid is frequently used.

Fluids can be supplied through an external system or an internal system. The external system is where the fluid channel, normally a tube, is spaced apart from the cutting tool holder. An internal system is where the fluid channel is part of or inside the cutting tool holder. Although an external system may have advantages such as flexibility, there are also disadvantages such as large distance from the outlet of the fluid to the cutting zone and risk of damage of the fluid channel, e.g. tube, by chips cut.

One type of application of fluid is called minimum quantity lubrication (MQL). MQL has many advantages compared to both dry machining, and conventional lubrication, also called flood coolant. One such advantage is fewer emissions. Therefore, for environmental reasons, MQL is becoming more attractive.

MQL is a mix or mixture of a liquid lubricant and air. Examples of suitable lubricants for MQL includes synthetic esters and fatty alcohols. Although separate channels or passages, i.e. dual channel systems, can be used for the lubricant and air, such system cost more and may require machines designed for MQL. Single-channel systems are therefore a more economical. If an internal system is used, making separate channels in the tool holder body is more expensive and reduces the mechanical strength of the tool holder body. However, in a dual channel system, the lubricant and air can be mixed when exiting the spindle, which would not require separate channels or passages in the tool holder body.

Moving and mixing the fluid comprising the lubricant and the air can be made in various ways, such as pushing air through a venture to siphon the fluid from a reservoir, in order to create aerosol particles. Pressure based or pump-based systems may alternatively be used.

The velocity of the air, or the airflow, drives the lubricant to the cutting zone. Up to 50 mL lubricant/hour is normally considered to be MQL, in any case a flow of lubricant over 500 mL per hour is not considered to be MQL. MQL therefore requires considerably less volume of liquid compared to so called flood coolant.

Air pressure is normally above 4 bar or above 60 psi. Normally, the least amount of airflow which is enough to carry the droplets of lubricant should be chosen.

EP1762320 discloses a boring tool with a coolant hole, which is said to be suitable for transporting a fluid used in MQL. The hole is formed inside the boring tool. The coolant hole is formed from three holes: a main hole, a secondary hole, and a communicating hole.

The communicating hole is a hole provided to connect the back end of the main hole and the front end of the secondary hole. The open end of the communicating hole is covered by a plug.

The inventor has found that the effect of MQL in metal cutting when using the boring tool disclosed in EP1762320 can be further improved.

SUMMARY OF THE INVENTION

An object of the present invention is to provide a metal cutting tool holder having improved effect of MQL in metal cutting. A further object is to provide a metal cutting tool holder where fluid passages for fluid supplied to a cutting zone are formed inside the tool holder body. A still further object is to provide metal cutting tool holder which can be manufactured in an economical way.

At least the main object is achieved with the initially defined metal cutting tool holder, which is characterized in that the tool holder comprises a member being positionable in the cavity such that a curved third fluid passage connecting the first outlet and the second inlet is formed at least partially by the member, in that the curved third fluid passage extends from a first end adjacent to the first outlet to a second end adjacent to the second inlet, the first direction is tangent to, or substantially tangent to, the curved third fluid passage at the first end, and the second direction is tangent to, or substantially tangent to, the curved third fluid passage at the second end.

By such metal cutting tool holder, droplet formation of the lubricant used in MQL is reduced. The inventor has found that traditional hole junctions give an unsatisfying flow of an fluid used in MQL causing droplet formation at hole junctions, or when the fluid undergo a rapid or sharp change in flow direction.

The curved third fluid passage allows the MQL fluid to flow in a manner which reduces droplet formation. Since the curved third fluid passage is tangent to the first direction at the first end, and is tangent to the second direction at the second end, an MQL fluid can flow from the first inlet to the second outlet in an effective manner with reduced risk of droplet formation, thereby improving the effect of the MQL fluid in a metal cutting operation.

By such metal cutting tool holder, blind holes inside the tool holder body, which reduces the effect of MQL, can be avoided.

By providing the metal cutting tool holder with a curved third fluid passage connecting the first outlet and the second inlet, formed at least partially by the member, the metal cutting tool holder body can be manufactured in an economical way such as drilling the first and second fluid passages, without the need for expensive production methods such as additive manufacturing.

A metal cutting tool holder is a device which adapted for use in a metal cutting operation, e.g. turning, milling, drilling or boring. The metal cutting tool holder is arranged to be mounted or connected to a machine tool, such as a CNC-lathe, either directly or indirectly by one or more tool holder, to a tool spindle or a tool post of the machine tool.

The tool holder body is one singular or single-piece body, preferably made from one piece of steel. The first and second fluid passages, or fluid through-holes, or fluid channels, are formed in the tool holder body, and are suitable for the transport of a fluid.

The first and second fluid passages preferably have a diameter which is at least 1 mm and less than 5 mm. The first and second fluid passages preferably are in the form of straight holes which preferably are drilled holes having circular cross-sections. Each of the first and second fluid passages preferably has constant diameters.

The first fluid passage extends in a first direction between a first inlet or entry and a first outlet or exit such that a fluid can be transported from the first inlet to the first outlet. The first inlet exits or intersects a surface of the tool holder body, which can be an inner surface or an outer surface of the tool holder body, such as a rear outer surface or a rear inner surface or a bottom outer surface of the tool holder body. The first inlet can be connected to a fluid channel in the machine spindle of the machine tool. The first inlet can be connected to a fluid channel in the form of a tube which is connected to the first inlet, preferably by a thread connection. The second outlet preferably intersects an outer or exterior surface of the tool holder body. A tube shaped object, such as a fluid or coolant nozzle tube, is preferably located in connection to the second outlet. The purpose for such tube shaped object is to further enhance the effect of the fluid in a metal cutting operation.

The second fluid passage extends in a second direction between a second inlet or entry and a second outlet or exit such that a fluid can be transported from the second inlet to the second outlet. The first direction is different to the second direction, which means that that the first direction forms an angle greater than zero in relation to the second direction.

The tool holder body comprises a cavity, i.e. a recess or a hole, such as a blind hole or a through hole. The cavity opens into or intersects an internal or preferably an external boundary surface of the tool holder body. The cavity preferably has a cylindrical shape. The first outlet and the second inlet intersect, or exit into, the cavity.

The first outlet and the second inlet are spaced apart, or are placed a distance greater than zero from each other.

The tool holder comprises a member or an element, which is a body preferably made from metal, e.g. steel. The member is a separate body than the tool holder body. The member is positionable or attachable or insertable mountable in, or inside, the cavity in such a way that the member do not move relative to the tool holder body. Means for position or attach or mount the member inside the cavity includes one or more, or a combination of: a screw, a thread, an adhesive such as glue, a brazing, a clamp, a spring, and a weld.

The member may be permanently positionable in the cavity. The member is preferably positionable in the cavity in such a way that it is removable in a non-destructive manner, e.g. by a screw. At least a portion of the member is located inside the cavity in a mounted state. Preferably the whole member is located inside the cavity in a mounted state.

A curved, preferably arc-shaped, third fluid passage is connecting the first outlet and the second inlet such that a fluid can flow, during a metal cutting operation, from the first fluid passage to the second fluid passage. The curved, preferably arc-shaped, third fluid passage preferably follows the path, or has a shape of, a portion of a circle, oval, or helix. The curved third fluid passage is preferably curved around a point inside the cavity. The third fluid passage is at least partially formed by the member. That is, the third fluid passage may be completely formed by the member, e.g. by a curved passage or hole having two openings in the member. The third fluid passage walls are thus completely formed by the member. The third fluid passage may alternatively be formed by both the member and the tool holder body. In other words, the third fluid passage may be located or running or extending between the member and the tool holder body. In other words, the third fluid passage wall or boundary surface may be formed by both the member and the tool holder body. The curved third fluid passage extends from a first end adjacent to, or communicating with, the first outlet to a second end adjacent to, or communicating with, the second inlet. Preferably, any gap between the ends of the third fluid passage and the respective adjacent outlet or inlet is less than 0.2 mm. The first and second ends of the third fluid passage are at least partially formed by, or intersects, an exterior surface of the member.

The first direction is tangent to, or substantially tangent to, the curved third fluid passage at the first end, and the second direction is tangent to, or substantially tangent to, the curved third fluid passage at the second end, such that a fluid can flow or run from the first outlet to the second inlet along a curved path, or in a way which is free from sharp changes in flow direction.

The first, second and third fluid passages together form a fluid passage, or fluid passage system, which preferably is blind hole free.

The size and shape of the cavity and the member are interrelated in such a way that fluid leakage is avoided or minimized. In other words, the shape of the cavity and member are interrelated in such a way that all or most, i.e. at least 99%, of the fluid entering the first inlet exits the second outlet.

According to an embodiment of the invention, the curved third fluid passage connecting the first outlet and the second inlet is formed by the member and the tool holder body.

By such metal cutting tool holder, the metal cutting tool holder can be manufactured in an even more economical manner, because the curved third fluid passage is formed by the member and the tool holder body together or jointly. For example, a groove can be formed in an external surface of the member, or a groove can be formed in a surface of the cavity, or a combination thereof. Therefore, no expensive curved through hole inside the member is necessary.

The third fluid passage is formed by the member and, i.e. together with, the tool holder body, i.e. the third fluid passage wall or boundary surface is formed by both the member and the tool holder body. In other words, the third fluid passage is located or runs or extends between the member and the tool holder body.

According to an embodiment of the invention, the metal cutting tool holder comprises an insert seat for a cutting insert, and wherein the second outlet is located between, or substantially between, the insert seat and the member.

In such a way, a fluid such as a fluid used in MQL can be directed towards the cutting insert, thereby improving a metal cutting operation, by improving heat removal, lubrication or chip removal, or a combination thereof.

An insert seat or an insert pocket is a formation in which or where a cutting insert can be mounted, by means of e.g. a screw or a clamp.

The second outlet is located between the insert seat and the member. In other words, the distance between the member and the insert seat is larger than both the distance from the member to the second outlet, and the distance from the second outlet to the insert seat. Put differently, the second direction, more specifically an extension of the second direction, intersects, in a top view, a cutting insert mountable in the insert seat. In other words, the second direction extends towards a cutting insert mountable in the insert seat.

According to an embodiment of the invention, the member has a cylindrical or substantially cylindrical shape, wherein the member comprises a circular or substantially circular top surface, an opposite circular or substantially circular bottom surface, and a side surface connecting the top surface and the bottom surface, and wherein a center axis of the member extends between the top surface and the bottom surface.

The effect is that the member can be manufactured in an economical manner. The cylindrical or substantially cylindrical shape of the member allows for the curved third fluid passage to have a constant or substantially constant curvature, which further reduces the risk of drop formation.

Preferably, at least a major portion, i.e. at least 50%, of the side surface of the member, is located at a constant distance from the center axis of the member. The curved third fluid passage is curved around the center axis of the member.

According to an embodiment of the invention, the member comprises a through hole extending between the top surface and the bottom surface, wherein a center axis of the through hole is different from the center axis of the member, wherein the cutting tool holder comprises a screw and a threaded hole opening in the cavity, wherein the member is attachable in the cavity by the screw, and wherein the screw is partly positioned inside the through hole.

By such an arrangement, the risk of rotation or incorrect location of the member in the cavity is reduced.

The member comprises a through hole, which is a screw hole, extending between the top surface and the bottom surface.

A center axis of the through hole is different, or offset, or spaced apart, from the center axis of the member. In other words, the center axis of the through hole does not coincide with the center axis of the member.

The cutting tool holder comprises a screw and a threaded hole opening in the cavity, such that the screw can be attached in the threaded hole.

The member is attachable or mountable in the cavity by the screw wherein the screw is partly positioned inside the through hole and partly positioned inside the threaded hole.

According to an embodiment of the invention, the through hole is parallel to, or substantially parallel to, and spaced apart from the center axis of the member, wherein the cavity opens in an exterior surface of the tool holder body, wherein the cavity comprises a bottom surface and a side surface, and wherein the threaded hole opens into the bottom surface of the cavity.

By such arrangement, the member can be easily placed in or removed from the cavity. Also, it can easily be detected if the member is sufficiently located in the cavity or if the screw needs to be further tightened. Further, leakage from between the cavity and the member can easily be observed.

The through hole is parallel to, or substantially, i.e. within 10°, parallel to, the center axis of the member.

The cavity opens in, or into, an exterior surface of the tool holder body.

The side surface connects the bottom surface of the cavity with the border of the opening of the cavity.

The bottom surface of the cavity is opposite the opening of the cavity, into which opening the member is positionable.

The cavity is preferably cylindrical or substantially cylindrical, wherein a radius of the cavity is identical to or substantially identical to a radius of the member.

The threaded hole which opens into, or intersects, the bottom surface of the cavity preferably. The threaded hole preferably has a centre axis thereof which is spaced apart from the center axis of the cavity.

According to an embodiment of the invention, a groove is formed in the side surface of the member.

By this, it is not necessary to form a groove inside the cavity, thus the tool holder body can be manufactured in a more economical way.

The groove preferably has a main extension in a plane perpendicular to or substantially perpendicular to, i.e. within 10°, to the center axis of the member. The groove is preferably spaced apart from the top surface of the member. The groove is preferably spaced apart from the bottom surface of the member.

According to an embodiment of the invention, the groove and the through hole are located on opposite or substantially opposite sides of the center axis of the member.

In such a way, the mechanical strength of the member is improved or a larger diameter screw, permitting safer location of the member in the cavity, can be chosen.

The groove and the through hole are located on opposite or substantially opposite sides of the center axis of the member, i.e. the center axis is located between the through hole and at least a portion of the groove.

According to an embodiment of the invention, when the member is mounted in the cavity, a first end of the groove corresponds to the first end of the curved third fluid passage and a second end of the groove corresponds to the second end of the curved third fluid passage.

An effect is that the flow of fluid is further improved, since the first or second ends of the groove do not form part of a blind hole. Formulated differently, since the first end of the curved third fluid passage extend to but not beyond the first outlet, and since the second end of the curved third fluid passage extend to, or until, but not beyond the second inlet, the curved third fluid passage can be free from any blind hole portion.

When the member is mounted in the cavity, a first end of the groove corresponds to, or partly together with a portion of the side surface of the cavity, forms the first end of the curved third fluid passage. In a corresponding manner, when the member is mounted in the cavity, a second end of the groove corresponds to, or partly together with a portion of the side surface of the cavity, forms the second end of the curved third fluid passage.

The first and second ends of the groove are end portions or end points of the groove in the main extension of the groove. Thus, the groove is not circular in shape. In other words, the groove does not extend 360° around the center axis of the member. Preferably the groove extend 20-300° around the center axis of the member.

When the member is mounted in the cavity, an angle formed by the first and second ends of the groove, measured from an imaginary intersection of extensions of the first direction and the second direction, is preferably identical or substantially identical, i.e. within 10°, preferably within 5°, to an angle formed by the first and second fluid passages.

The member is mounted in the cavity in such a way that the member is not moveable in relation to the tool holder body. In other worlds, the member is locked or unmoveable in the cavity. This can be achieved by e.g. locking the member in the cavity by a screw inside a screw hole formed in the cavity, wherein the screw hole is placed such that rotation of the member inside the cavity is not possible.

According to an embodiment of the invention, the first end of the groove corresponding to the first end of the curved third fluid passage has a concave bottom surface having a first radius, wherein the second end of the groove corresponding to the second end of the curved third fluid passage has a concave bottom surface having a second radius, wherein the first radius is larger than the second radius.

In such a way, the curved third fluid passage can have ends which have a cross sectional area which corresponds to the cross sectional areas of the first and second fluid passages even if the cross sectional areas of the first and second fluid passages are different, thereby further improving the flow of fluid.

The first and second ends of the groove thus have a concave shape in cross section in a plane comprising the center axis of the member.

According to an embodiment of the invention, a diameter of the first fluid passage is larger than a diameter of the second fluid passage.

In such a way the velocity of the fluid is increased at the second outlet, thereby improving the effect of the fluid in a metal cutting operation.

The first and second fluid passages thus are circular in cross section.

According to an embodiment of the invention, the first end of the curved third fluid passage has a larger cross sectional area than the second end of the curved third fluid passage.

In such a way, the curved third fluid passage has ends which have cross sectional areas which can correspond to the respective adjacent fluid passage, thereby improving the fluid flow.

Preferably, the first end of the curved third fluid passage has a cross section which has the same, or substantially the same, size as the cross section of the first outlet. Preferably, the second end of the curved third fluid passage has a cross section which has the same, or substantially the same, size as the cross section of the second inlet.

According to an embodiment of the invention, the first direction and the second direction are located in a common plane.

In such a way, the member can be made smaller in height, i.e. having a smaller distance between the top and bottom surfaces, thereby reducing the depth of the cavity, which gives improved mechanical strength of the tool holder body.

According to an embodiment of the invention, the tool holder body comprises a coupling comprising a flange surface and a tapered surface symmetrically or substantially symmetrically arranged around a longitudinal center axis of the tool holder body, wherein the flange surface is perpendicular to the longitudinal center axis of the tool holder body, wherein the first inlet intersects the flange surface.

In such a way, the metal cutting tool holder can be used with an accurate and stable quick change coupling system which is not optimized for fluid supply used in MQL.

One example of such a coupling is the coupling according to ISO 26623-1:2014.

According to an embodiment of the invention, the cavity comprises a bottom surface and a side surface, wherein each of the first outlet and the second inlet intersect the side surface of the cavity.

The bottom surface can be circular or substantially circular, flat or planar, or substantially flat or substantially planar. In other words, the bottom surface is disk-shaped or substantially disk-shaped. The side surface can be a circumferential side surface, such as a side of a circular cylinder.

A further aspect of the invention relates to a method to machine a metal work piece by a turning operation comprising the steps of supplying a metal cutting tool holder according to the invention, fastening a turning insert in the insert seat, supplying a metal work piece, rotating the metal work piece, supplying a fluid from the first inlet to the second outlet, and moving the metal cutting tool holder relative to the metal work piece such that a cutting edge of the turning insert cuts chips from the metal work piece.

The fluid is preferably a mixture of lubricant and air. The volume of supplied lubricant included in the mixture supplied into the first inlet is preferably less than 500 mL/hour, even more preferably less than 50 mL/hour.

DESCRIPTION OF THE DRAWINGS

The present invention will now be explained in more detail by a description of different embodiments of the invention and by reference to the accompanying drawings.

FIG. 9 is a view of cross section E-E in FIG. 8.

FIG. 10 is a further side view of the member in FIG. 7.

FIG. 11 is a still further side view of the member in FIG. 7.

All drawings or figures have been drawn to scale.

DETAILED DESCRIPTION OF EMBODIMENTS OF THE INVENTION

Figure 1:
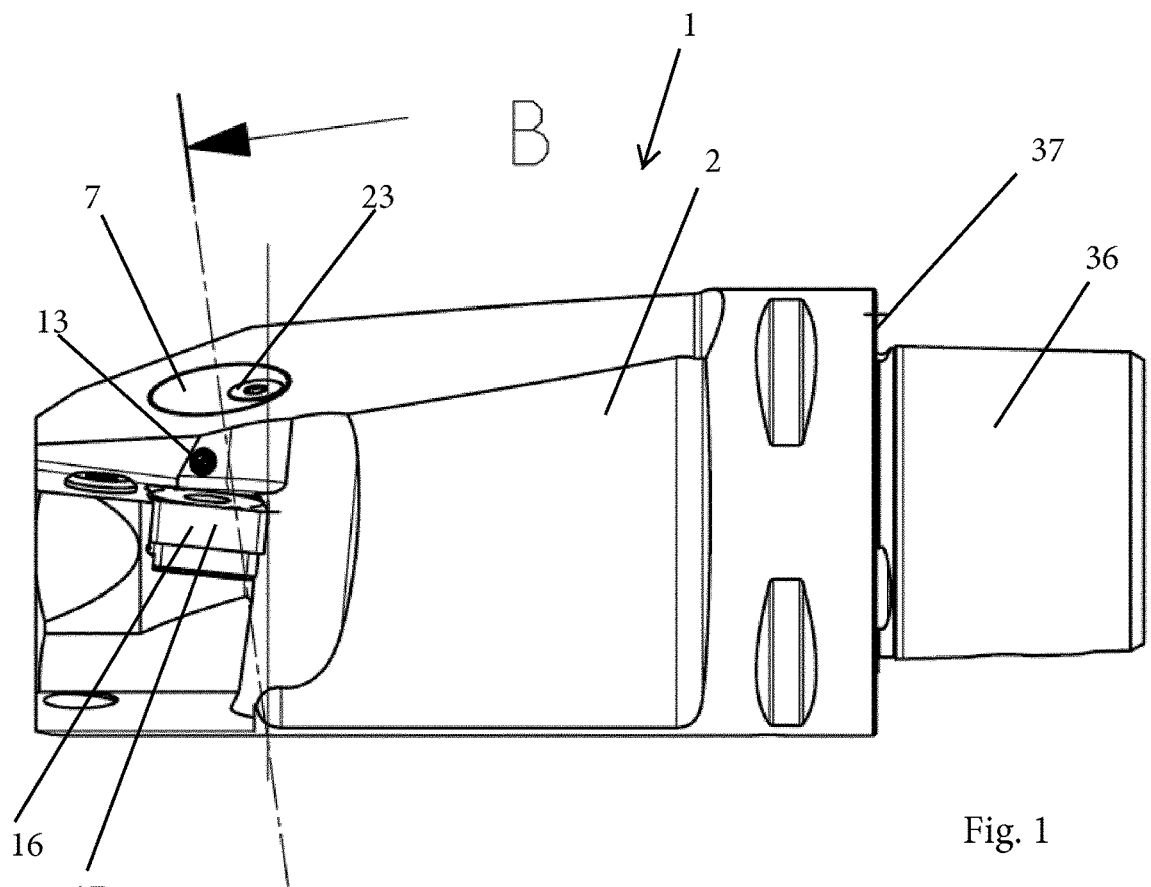
FIG. 1 is a side view of a metal cutting tool holder according to a first embodiment.

Reference is made to FIG. 1, which show a side view of metal cutting tool holder 1 according to a first embodiment.

The a metal cutting tool holder 1, which is a turning tool holder, comprises a tool holder body 2, which is made from one piece of a metal alloy, in the first embodiment the metal alloy is steel. The metal cutting tool holder 1 comprises an insert seat 16 for a cutting insert 17 in the form of a turning insert. The turning insert is made from a harder material than the tool holder body 2, such as cemented carbide. The tool holder 1 comprises a member 7 being attached to the tool holder body 2 by means of a screw 23. The member is positioned in a cavity in the form of a blind hole opening in an external surface of the tool holder body 2. A second outlet 13 is located between, or substantially between, the insert seat 16 and the member 7. The second outlet 13 is arranged such that a fluid exiting the second outlet 13 flows towards the cutting insert 17. The tool holder body 2 comprises a coupling comprising a flange surface 37 and a tapered surface 36. The coupling is according to ISO 26623-1:2014. The coupling is formed at a rear end of the tool holder body 2 and is suitable to be coupled directly or indirectly, i.e. by a further extension body, to a machine tool such as a machine spindle of a CNC-machine not shown.

Figure 2:
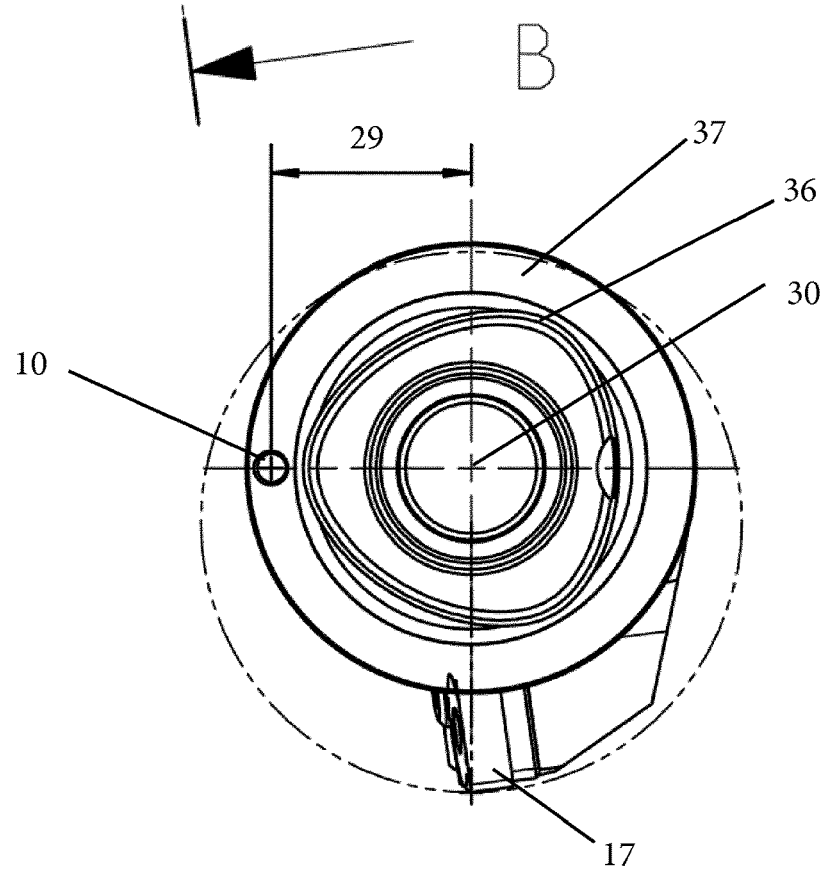
FIG. 2 is a rear view of the metal cutting tool holder in FIG. 1.

Reference is now made to FIG. 2 which shows a rear view of the metal cutting tool holder 1 in FIG. 1. The coupling comprising a flange surface 37 and a tapered surface 36. The tapered surface 36 is substantially symmetrically arranged around a longitudinal center axis 30 of the tool holder body. The flange surface 37 is perpendicular to the longitudinal center axis 30 of the tool holder body. A first inlet 10 for a fluid intersects the flange surface 37. The first inlet 10 is located a radial distance 29 from the longitudinal center axis 30 of the tool holder body. The radial distance 29 is in the range of 10-100 mm. At least a portion of the cutting insert 17 extends a greater radial distance from the longitudinal center axis 30 of the tool holder body, than the radial distance 29.

Figure 3:
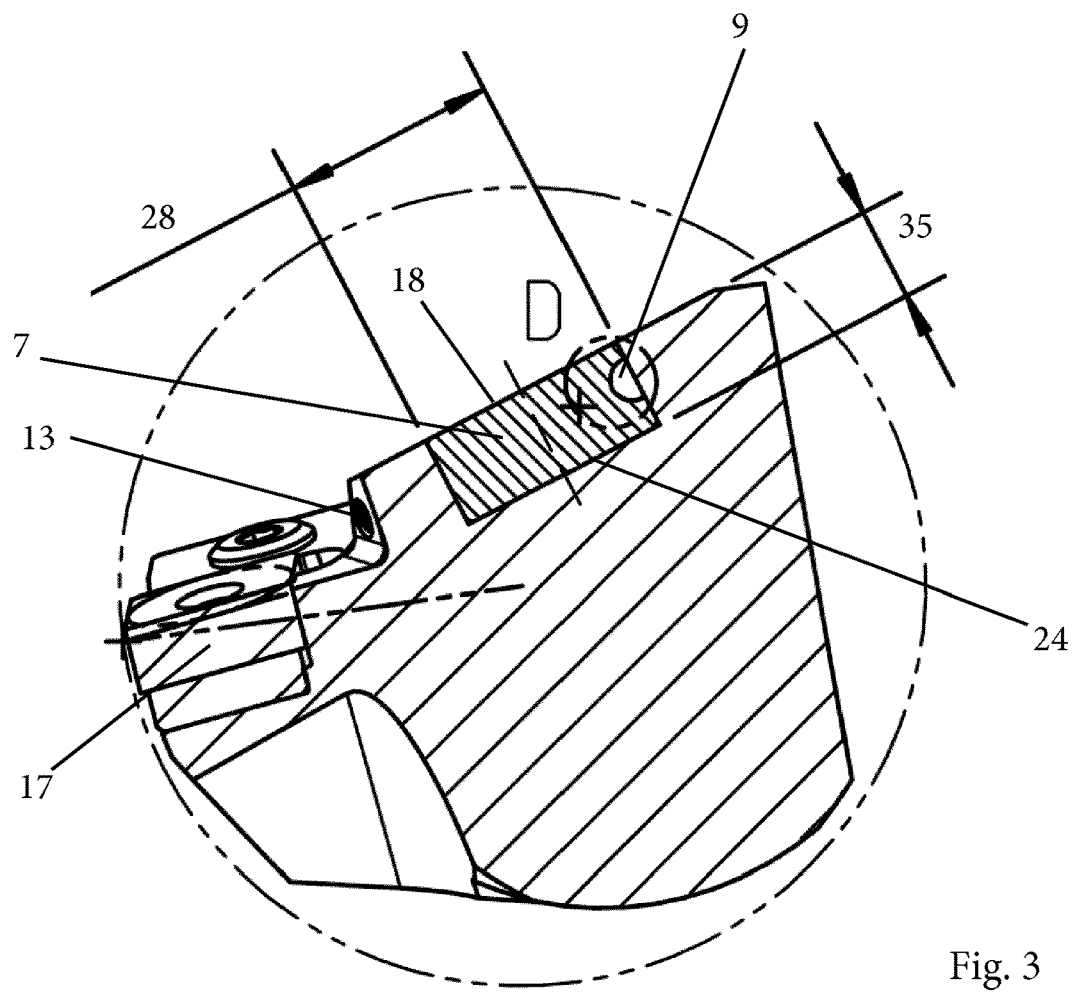
FIG. 3 is a view of cross section B-B in FIG. 1.

Reference is now made to FIG. 3, which is a view of cross section B-B in FIG. 1. The second outlet 13 is located substantially between, the cutting insert 17 and the member 7. The member 7 comprises a top surface 18 and an opposite bottom surface, which is in contact with a bottom surface 24 in the cavity which the member is located. The member 7 and the cavity have the same diameter. The member has a diameter 28 which is in the range of 5-40 mm, in the first embodiment the diameter 28 is 16 mm. The depth of the cavity and the height of the member 7 is substantially the same. The height 35 of the member 7 is in the range of 2-20 mm. A curved third fluid passage 9 is formed by the member 7 and the tool holder body together. More precisely, the curved third fluid passage 9 is formed by a groove in a side surface of the member 7 and a side surface of the cavity.

Figure 4:
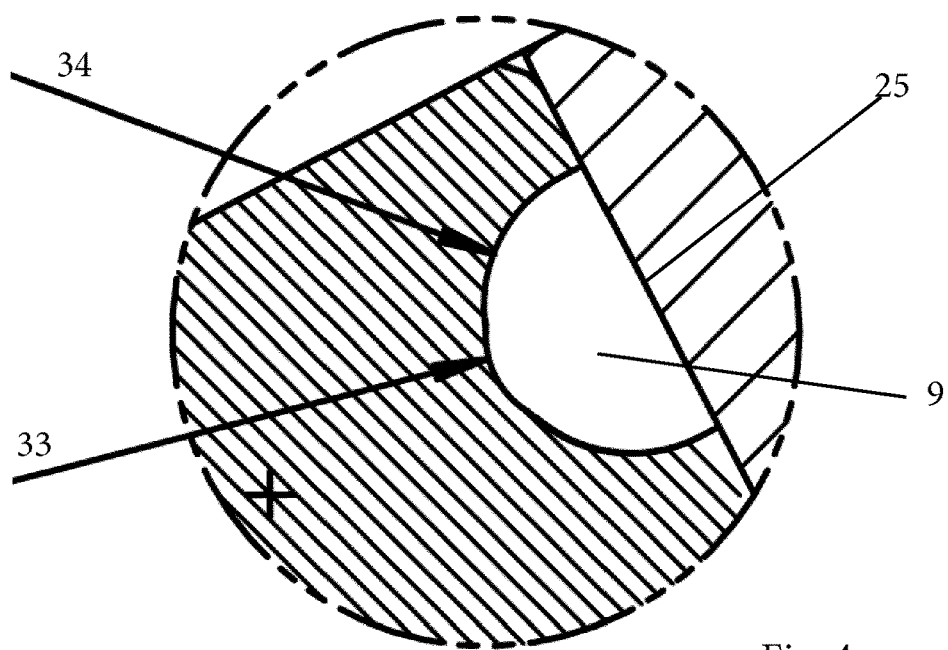
FIG. 4 is a detailed view of the section D in FIG. 3.

Reference is now made to FIG. 4, which is a detailed view of the section D in FIG. 3. A side surface 25 of the cavity together with a groove formed in a side surface of the member together form the curved third fluid passage 9. The groove has a concave bottom surface. The concave bottom surface comprises a first radius 34 and a second radius 33, where the first radius 34 is larger than the second radius 33.

Figure 5:
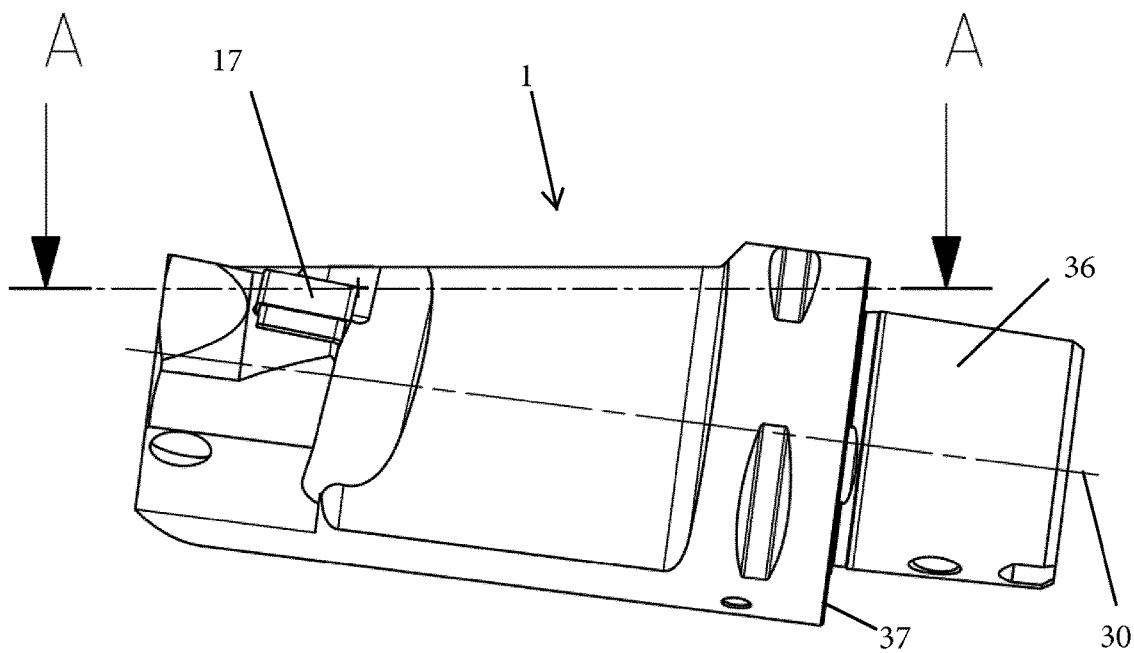
FIG. 5 is a further side view of the metal cutting tool holder in FIG. 1.

Reference is now made to FIG. 5, which is a further side view of the metal cutting tool holder 1 in FIG. 1. The metal cutting tool holder 1 comprises a cutting insert 17 and a coupling comprising a flange surface 37 and a tapered surface 36 substantially symmetrically arranged around a longitudinal center axis 30 of the tool holder body.

Figure 6:
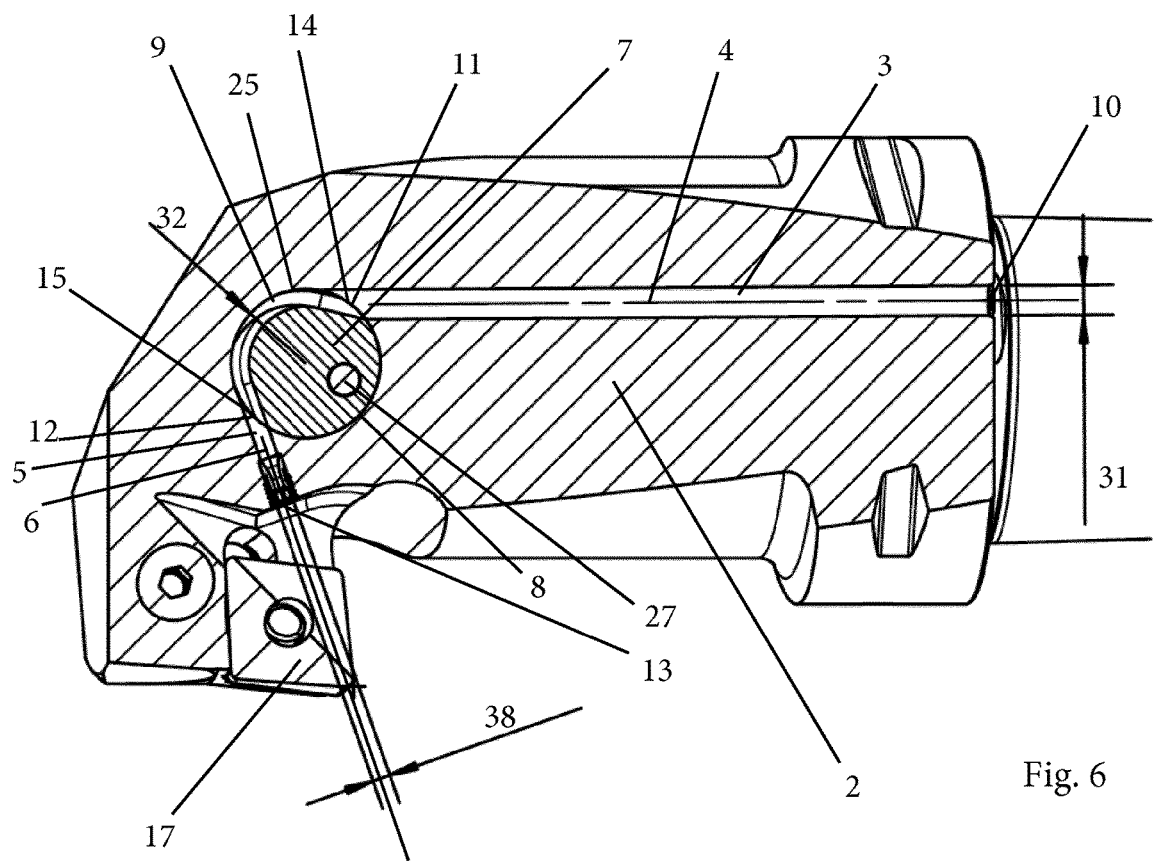
FIG. 6 is a top view of cross section A-A in FIG. 5.

Reference is now made to FIG. 6, which is a top view of cross section A-A in FIG. 5. The tool holder body 2 comprises a first fluid passage 3 which extends in a first direction 4 between a first inlet 10 and a first outlet 11. The tool holder body 2 further comprises a second fluid passage 5 extending in a second direction 6 between a second inlet 12 and a second outlet 13. The second outlet 13 is arranged such that a fluid exiting the second outlet 13 flows towards the cutting insert 17. The second outlet 13 is arranged such that a fluid exiting the second outlet 13 flows towards a portion of the cutting insert 17, positioned in the insert seat, which is located at a largest distance from the longitudinal center axis of the tool holder body 2. The first direction 4 is different from the second direction 6. The diameter 31 of the first fluid passage 3 is larger than the diameter 38 of the second fluid passage 5. The tool holder body 2 comprises a cavity 8. The first outlet 11 and the second inlet 12 intersect the cavity 8. The first outlet 11 and the second inlet 12 are spaced apart. A member 7 is positioned in the cavity 8 such that a curved third fluid passage 9 connecting the first outlet 11 and the second inlet 12 is formed. A side surface 25 of the cavity 8 together with a groove formed in a side surface of the member 7 together form the curved third fluid passage 9. The curved third fluid passage 9 extends from a first end 14 adjacent to the first outlet 11 to a second end 15 adjacent to the second inlet 12.

A first end of the groove corresponds to the first end 14 of the curved third fluid passage 9 and a second end of the groove corresponds to the second end 15 of the curved third fluid passage. In other words, the extension of the groove formed in the side surface of the member corresponds to, or is equal or substantially equal to, the extension of the curved third fluid passage. The first direction 4 is tangent to, or substantially tangent to, the curved third fluid passage 9 at the first end 14. The second direction 6 is tangent to, or substantially tangent to, the curved third fluid passage 9 at the second end 15. The diameter 31 of the first fluid passage 3 is larger than a diameter 38 of the second fluid passage 5. The first end 14 of the curved third fluid passage 9 has a larger cross sectional area than the second end 15 of the curved third fluid passage 9.

The radius 32 of the cavity 8 is equal to, or substantially equal to, the radius of curvature of the curved third fluid passage 9. More specifically, the radius 32 of the cavity 8 is equal to, or substantially equal to, the radius of curvature of an outer portion of the curved third fluid passage 9, where the outer portion of the curved third fluid passage is the portion of the curved third fluid passage which is located at a largest distance from the center axis of the cavity.

The radius 32 of the cavity 8 is identical to or substantially identical half the diameter of the member 7. The curved third fluid passage 9 is curved around a point located at or substantially at the center axis of the member 7. The through hole 27 of the member 7 is off center, i.e. spaced apart from the center axis of the member 7. The groove and the through hole 27 are located on opposite or substantially opposite sides of the center axis of the member 7.

As can be seen in FIG. 6, the cavity 8 comprises a bottom surface and a side surface 25, wherein each of the first outlet 11 and the second inlet 12 intersect the side surface 25 of the cavity 8. Said bottom surface is preferably circular or substantially circular. Said bottom surface is preferably flat or planar, or substantially flat or substantially planar. In other words, said bottom surface is disk-shaped or substantially disk-shaped. Said side surface 25 is preferably a circumferential side surface 25. Said side surface 25 is preferably shaped as a side of a circular cylinder.

The metal cutting tool holder is preferably produced in a way which includes the steps supplying a solid steel blank, forming the cavity by a metal cutting operation such as milling, and drilling the first and second fluid passages by metal cutting drilling such that each drilling cutting operation ends inside the cavity. In such a way, the metal cutting tool holder body can be manufactured in an economical manner. The drill or drills used when forming the first and second fluid passages are thus during cutting moving in respective directions towards the cavity.

Figure 7:
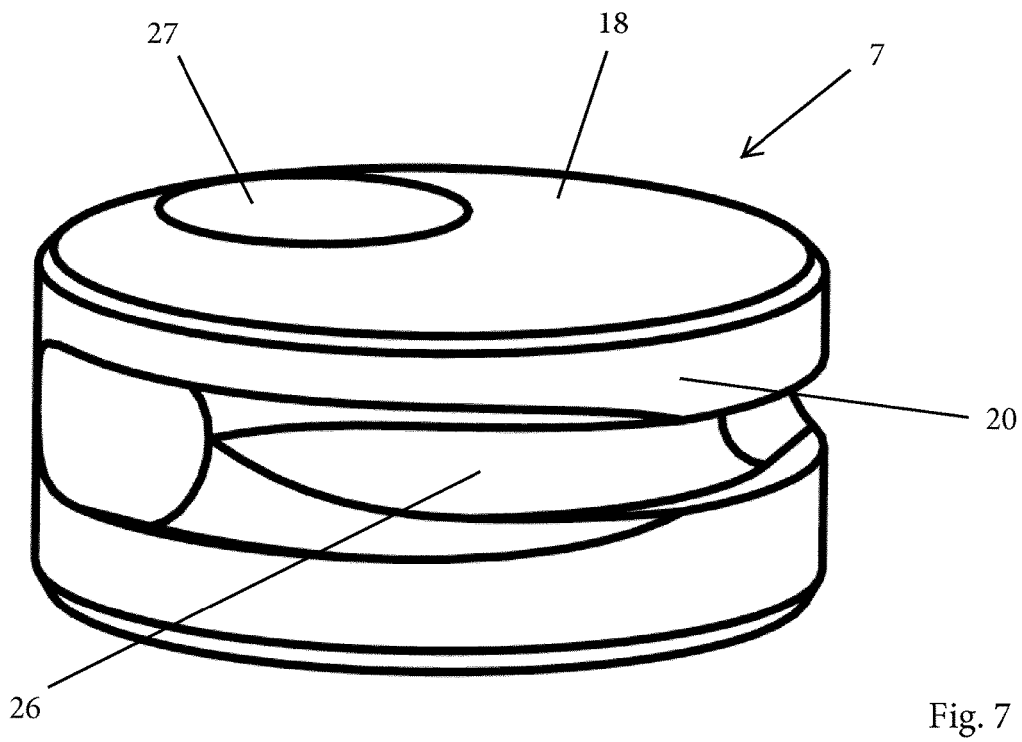
FIG. 7 is a perspective view of the member from the metal cutting tool holder in FIG. 1.

Reference is now made to FIG. 7, which is a perspective view of the member 7 from the metal cutting tool holder in FIG. 1. The member 7 comprises a circular, or substantially circular, top surface 18, an opposite circular or substantially circular bottom surface 19. At least a portion of the bottom surface 19 of the member 7 is when mounted in the cavity form in the tool holder body in contact with at least a portion of the bottom surface of the cavity. A side surface 20 connects the top surface 18 the bottom surface 19. A groove 26 is formed in the side surface 20 of the member 7. A through hole 27 extends from the top surface 18 to the bottom surface 19.

Figure 8:
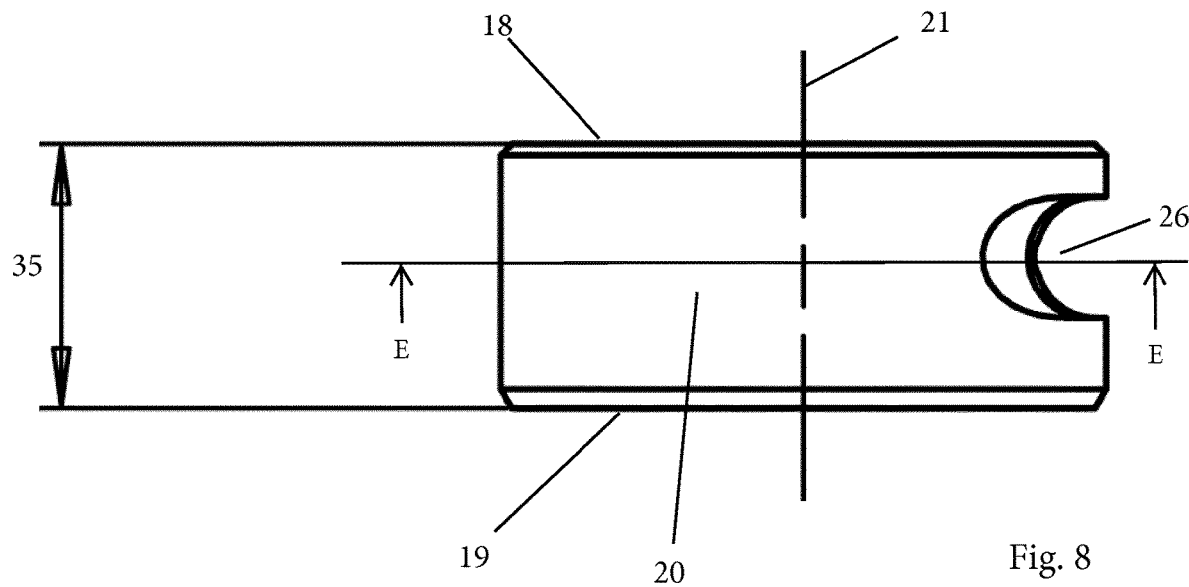
FIG. 8 is a side view of the member in FIG. 7.

Reference is now made to FIGS. 8, 10 and 11, which show side views of the member in FIG. 7. The member 7 comprises a top surface 18 and an opposite bottom surface 19. The top surface 18 bottom surface 19 each extends in parallel or substantially parallel planes. A center axis 21 of the member 7 extends between the top surface 18 and the bottom surface 19. A side surface 20 connects the top surface 18 the bottom surface 19. A major portion, i.e. more than 50%, preferably more than 80%, of the area of the side surface 20 is located at a constant or substantially constant distance from the center axis 21 of the member 7. A groove 26 is formed in the side surface 20 of the member 7. The groove 26 is spaced apart from the top surface 18. The groove 26 is spaced apart from the bottom surface 19. The groove 26 has a concave bottom surface.

The concave bottom surface is spaced apart from the center axis 21 of the member 7. A first end of the groove 26 has a concave bottom surface having a first radius, or radius of curvature 34. A second end of the groove 26 has a concave bottom surface having a second radius, or radius of curvature, 33. The first radius 34 is larger than the second radius 33.

Reference is now made to FIG. 9, which is a view of cross section E-E in FIG. 8. A center axis 22 of the through hole 27 spaced apart from the center axis 21 of the member 7. The groove and the through hole 27 are located on opposite or substantially opposite sides of the center axis 21 of the member 7. Formulated differently, a portion of the groove, located half way between the first end and the second end of the groove, and the through hole 27 are located on opposite or substantially opposite sides of the center axis 21 of the member 7. The first end of the groove corresponds to the first end 14 of the curved third fluid passage 9 and the second end of the groove corresponds to the second end 15 of the curved third fluid passage 9. The member has a diameter 28 which is in the range of 5-40 mm. In the first embodiment the diameter 28 is 16 mm.

Reference is now made to FIGS. 12 to 15, which show a metal cutting tool holder according to a second embodiment. The metal cutting tool holder according to the second embodiment significantly differs from the metal cutting tool holder according to the first embodiment only in that the shape of the side surface of the member is different, and in that the shape of the side surface of the cavity is different.

Figure 12:
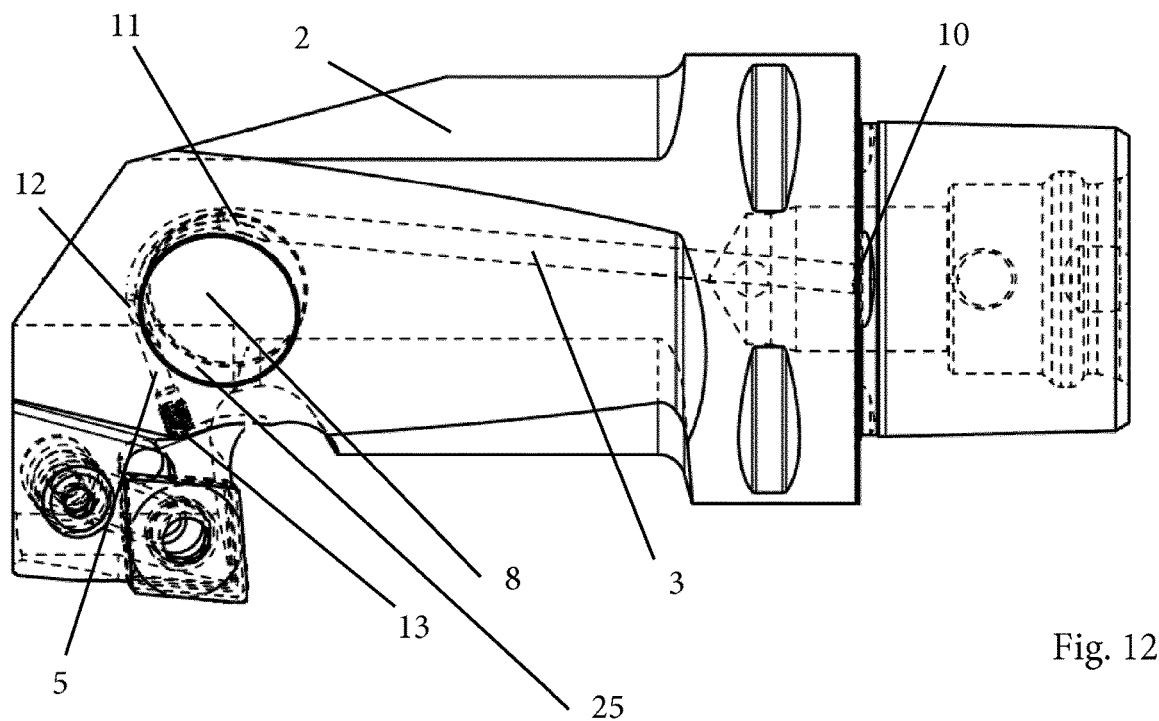
FIG. 12 is a top view of a tool holder body which is part of a metal cutting tool holder according to a second embodiment, analogous to FIG. 6.

Reference is now made to FIG. 12, which show a top view of a tool holder body 2 which forms part of a metal cutting tool holder according to a second embodiment. A cavity 8, for a member, in the form of a blind hole opening in an external surface of the tool holder body 2 is formed. A second outlet 13 is located between, or substantially between, an insert seat and the cavity 8. The second outlet 13 is arranged such that a fluid exiting the second outlet 13 flows towards the cutting insert. The tool holder body 2 comprises a coupling comprising a flange surface 37 and a tapered surface 36. The coupling is according to ISO 26623-1:2014. The coupling is formed at a rear end of the tool holder body 2 and is suitable to be coupled directly or indirectly, i.e. by a further extension body, to a machine tool such as a machine spindle of a CNC-machine not shown. The tool holder body 2 comprises a first fluid passage 3 which extends between a first inlet 10 and a first outlet 11. The tool holder body 2 further comprises a second fluid passage 5 extending between a second inlet 12 and a second outlet 13. The first outlet 11 and the second inlet 12 intersect the cavity 8. The first outlet 11 and the second inlet 12 are spaced apart. A member is positionable in the cavity 8 such that a curved third fluid passage connecting the first outlet 11 and the second inlet 12 is formed. A groove formed in the side surface 25 of the cavity 8 together with a side surface of the member together form the curved third fluid passage. The curved third fluid passage 9 extends from a first end adjacent to the first outlet 11 to a second end adjacent to the second inlet 12.

A first end of the groove formed in the side surface 25 of the cavity 8 corresponds to the first end of the curved third fluid passage 9 and a second end of the groove corresponds to the second end 15 of the curved third fluid passage.

In other words, the extension of the groove formed in the side surface of the cavity corresponds to, or is equal or substantially equal to, the extension of the curved third fluid passage.

Figure 13:
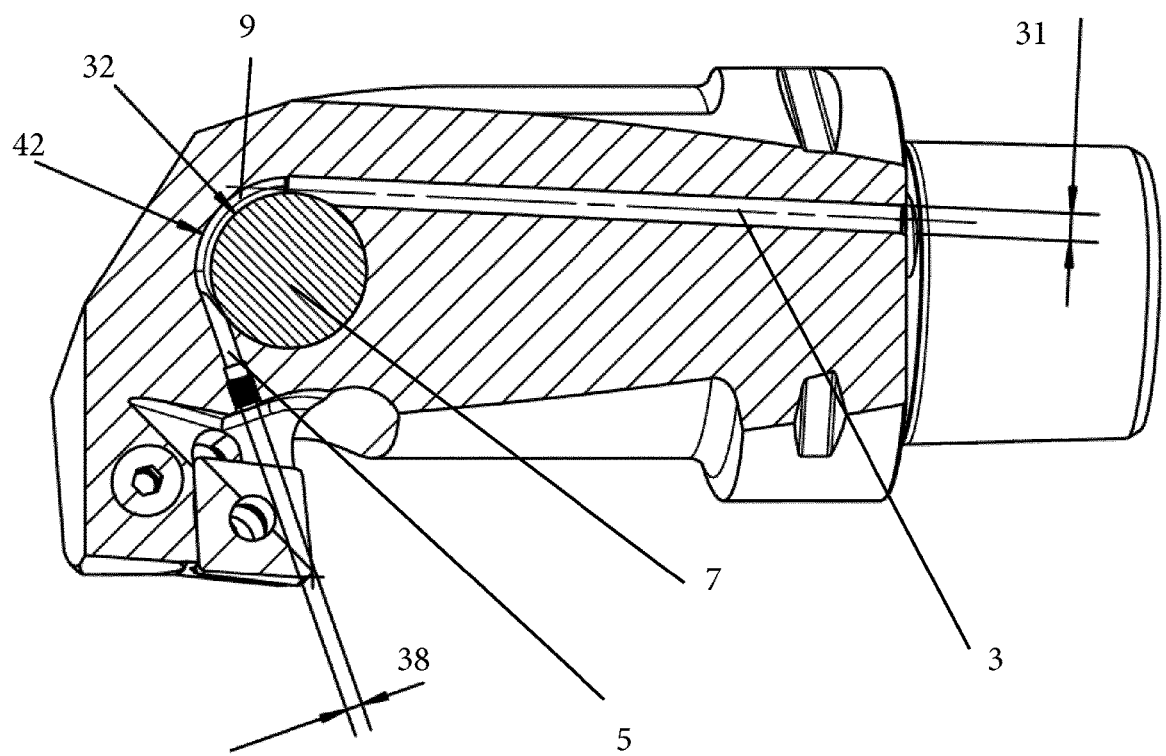
FIG. 13 is a top view of a cross section of a metal cutting tool holder comprising the tool holder body in FIG. 12

Reference is now made to FIG. 13, which is a top view of a cross section of a metal cutting tool holder comprising the tool holder body in FIG. 12, analogous to the view shown in FIG. 6. The tool holder body comprises a first fluid passage 3 which extends in a first direction between a first inlet and a first outlet. The tool holder body further comprises a second fluid passage 5 extending in a second direction between a second inlet and a second outlet. The first direction is different from the second direction. The diameter 31 of the first fluid passage 3 is larger than the diameter 38 of the second fluid passage 5. The tool holder body comprises a cavity. The first outlet and the second inlet intersect the cavity. The first outlet and the second inlet are spaced apart. A member 7 is positioned in the cavity such that a curved third fluid passage 9 connecting the first outlet and the second inlet is formed. A groove formed in the side surface of the cavity together with a side surface of the member 7 together form the curved third fluid passage 9. The curved third fluid passage 9 extends from a first end adjacent to the first outlet to a second end adjacent to the second inlet. The first direction is tangent to, or substantially tangent to, the curved third fluid passage 9 at the first end. The second direction is tangent to, or substantially tangent to, the curved third fluid passage 9 at the second end. The radius 32 of the cavity is equal to, or substantially equal to, the radius of curvature of the curved third fluid passage 9. More specifically, the radius 32 of the cavity is equal to, or substantially equal to, the radius of curvature of an inner portion of the curved third fluid passage 9, where the inner portion of the curved third fluid passage is the portion of the curved third fluid passage which is located at a largest distance from the center axis of the cavity. A radius 42 of an outer portion of the curved third fluid passage is equal to the distance from the center axis of the cavity to the bottom of the groove formed in the side surface of the cavity. The member 7 has a cylindrical or substantially cylindrical shape. The member 7 is located in the cavity by any suitable means.

Figure 14:
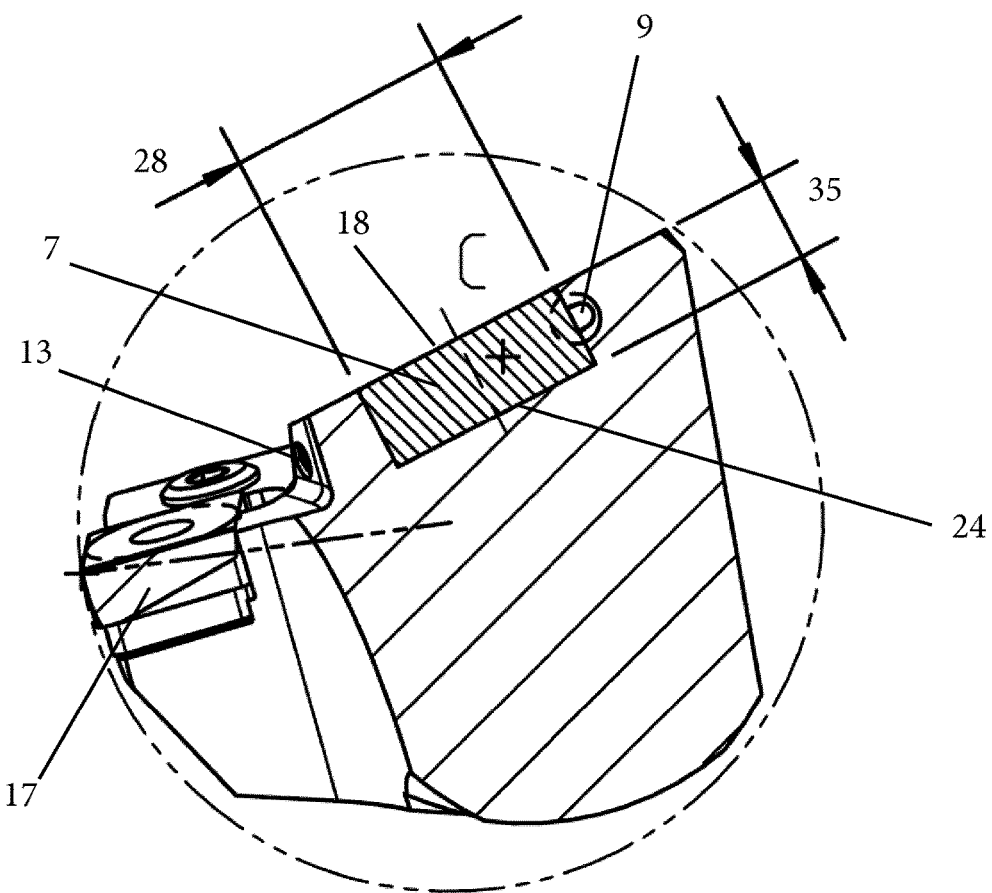
FIG. 14 is a view of a cross section, analogous to FIG. 3, of the metal cutting tool holder in FIG. 13.

Reference is now made to FIG. 14 which is a view of a cross section of the metal cutting tool holder in FIG. 13, analogue to FIG. 3. The second outlet 13 is located substantially between, the cutting insert 17 and the member 7. The member 7 comprises a top surface 18 and an opposite bottom surface, which is in contact with a bottom surface 24 in the cavity which the member is located. The member 7 and the cavity have the same diameter. The member has a diameter 28 which is in the range of 5-40 mm, in the second embodiment the diameter 28 is 16 mm. The depth of the cavity and the height of the member 7 is substantially the same. The height 35 of the member 7 is in the range of 2-20 mm. A curved third fluid passage 9 is formed by the member 7 and the tool holder body together. More precisely, the curved third fluid passage 9 is formed by a groove in a side surface of the cavity and a side surface of the member 7.

Figure 15:
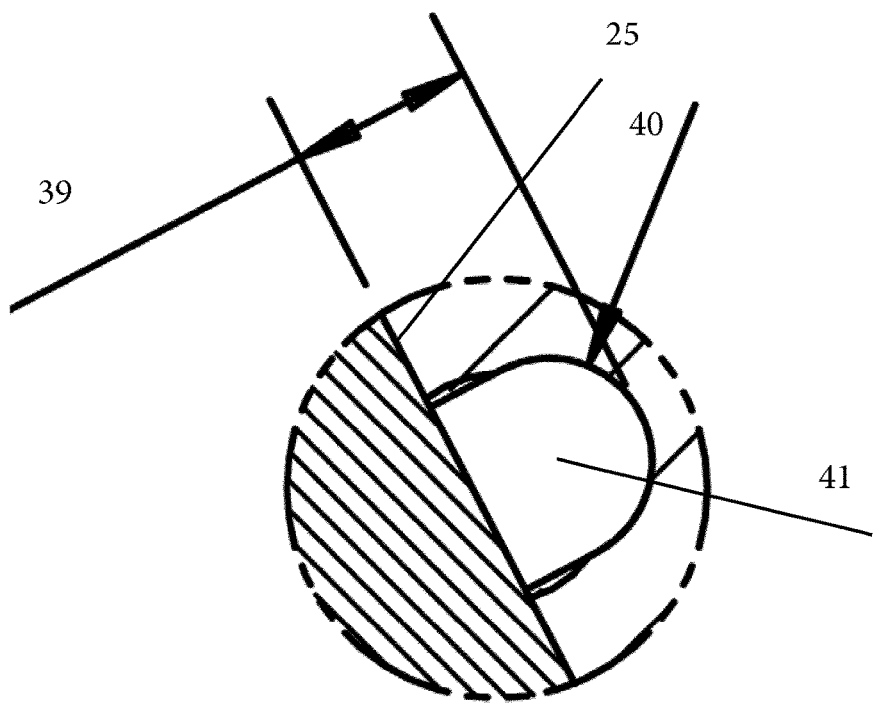
FIG. 15 is a detailed view of section C in FIG. 14.

Reference is now made to FIG. 15, which is a detailed view of the section C in FIG. 14. In the side surface 25 of the cavity a groove 41 is formed which together with a side surface of the member form the curved third fluid passage. The groove 41 has a concave bottom surface. The concave bottom surface of the groove 41 has a radius which is in the range of 0.5-5.0 mm. In the second embodiment, the radius is 1.0 mm.

According to a third embodiment, not shown, the metal cutting tool holder comprises a tool holder body, the tool holder body comprising a first fluid passage extending in a first direction between a first inlet and a first outlet, and a second fluid passage extending in a second direction between a second inlet and a second outlet, wherein the first direction is different from the second direction, the tool holder body comprises a cavity, the first outlet and the second inlet intersect the cavity, the first outlet and the second inlet are spaced apart, the tool holder comprises a member being positionable in the cavity such that a curved third fluid passage connecting the first outlet and the second inlet is formed at least partially by the member, in that the curved third fluid passage extends from a first end adjacent to the first outlet to a second end adjacent to the second inlet, the first direction is tangent to, or substantially tangent to, the curved third fluid passage at the first end, and the second direction is tangent to, or substantially tangent to, the curved third fluid passage at the second end.

The metal cutting tool holder further comprises a ring shaped sealing located between the side surface of the cavity and the side surface of the member. The ring shaped sealing member is located between the curved third fluid passage and the top surface of the member. The ring shaped sealing member is made from a material which is suitable for preventing fluid leakage, such as a flexible material. In the second embodiment, the material of the ring shaped sealing member is rubber.

According to a fourth embodiment, not shown, the metal cutting tool holder comprises a tool holder body, the tool holder body comprising a first fluid passage extending in a first direction between a first inlet and a first outlet, and a second fluid passage extending in a second direction between a second inlet and a second outlet, wherein the first direction is different from the second direction, the tool holder body comprises a cavity, the first outlet and the second inlet intersect the cavity, the first outlet and the second inlet are spaced apart, the tool holder comprises a member being positionable in the cavity such that a curved third fluid passage connecting the first outlet and the second inlet is formed at least partially by the member, in that the curved third fluid passage extends from a first end adjacent to the first outlet to a second end adjacent to the second inlet, the first direction is tangent to, or substantially tangent to, the curved third fluid passage at the first end, and the second direction is tangent to, or substantially tangent to, the curved third fluid passage at the second end.

Further, the metal cutting tool holder comprises an insert seat located at a front end thereof. Further, the metal cutting tool holder has a cross section, perpendicular to a longitudinal center axis of the tool holder body which is rectangular, e.g. square shaped, at least at a rear end of the metal cutting tool holder, which rear end is opposite the front end of the metal cutting tool holder. Further, the first inlet intersects an external or outer surface of the tool holder body. Further, the first inlet is arranged such that an external tube can be connected to the first inlet.

According to a fifth embodiment, not shown, the metal cutting tool holder comprises a tool holder body, the tool holder body comprising a first fluid passage extending in a first direction between a first inlet and a first outlet, and a second fluid passage extending in a second direction between a second inlet and a second outlet, wherein the first direction is different from the second direction, the tool holder body comprises a cavity, the first outlet and the second inlet intersect the cavity, the first outlet and the second inlet are spaced apart, the tool holder comprises a member being positionable in the cavity such that a curved third fluid passage connecting the first outlet and the second inlet is formed at least partially by the member, in that the curved third fluid passage extends from a first end adjacent to the first outlet to a second end adjacent to the second inlet, the first direction is tangent to, or substantially tangent to, the curved third fluid passage at the first end, and the second direction is tangent to, or substantially tangent to, the curved third fluid passage at the second end.

Further, the metal cutting tool holder is a grooving tool holder, comprising an insert seat for a grooving insert. Further, the cavity is in the form of a through hole. Further, the metal cutting tool holder comprises the member, the member being permanently attached or attachable to or in the cavity formed in the tool holder body.

The invention is not limited to the embodiments disclosed, but may be varied and modified within the scope of the following claims.

For example, although the metal cutting tool holder is preferably used with the fluid being a mixture of lubricant or air such as MQL, positive effects have been observed also when using other fluids, such as emulsion, oil, water, or a combination thereof.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A metal cutting tool holder comprising:
   a tool holder body, the tool holder body including a first fluid passage extending in a first direction between a first inlet and a first outlet and a second fluid passage extending in a second direction between a second inlet and a second outlet, wherein the first direction is different from the second direction, the tool holder body including a cavity, wherein the first outlet and the second inlet intersect the cavity, the first outlet and the second inlet being spaced apart; and a member positioned in the cavity such that a curved third fluid passage connecting the first outlet and the second inlet is formed at least partially by the member, wherein the curved third fluid passage extends from a first end adjacent to the first outlet to a second end adjacent to the second inlet, the first direction being tangent to, or substantially tangent to, the curved third fluid passage at the first end, and the second direction being tangent to, or substantially tangent to, the curved third fluid passage at the second end, wherein the curved third fluid passage connecting the first outlet and the second inlet is formed by the member and the tool holder body.

2. The metal cutting tool holder according to claim 1, further comprising an insert seat arranged to receive a cutting insert, and wherein the second outlet is located between, or substantially between, the insert seat and the member.

3. The metal cutting tool holder according to claim 1, wherein the member has a cylindrical or substantially cylindrical shape, wherein the member includes a circular or substantially circular top surface, an opposite circular or substantially circular bottom surface, and a side surface connecting the top surface the bottom surface, and wherein a center axis of the member extends between the top surface and the bottom surface.

4. The metal cutting tool holder according to claim 3, wherein the member includes a through hole extending between the top surface and the bottom surface, wherein a center axis of the through hole is different from the center axis of the member, wherein the cutting tool holder includes a screw and a threaded hole opening in the cavity, wherein the member is attachable in the cavity by the screw, and wherein the screw is partly positioned inside the through hole.

5. The metal cutting tool holder according to claim 4, wherein the through hole is parallel to, or substantially parallel to, and a spaced apart from the center axis of the member, wherein the cavity opens in an exterior surface of the tool holder body, wherein the cavity includes a bottom surface and a side surface, and wherein the threaded hole opens into the bottom surface of the cavity.

6. The metal cutting tool holder according to claim 1, wherein a groove is formed in the side surface of the member.

7. The metal cutting tool holder according to claim 6, wherein the member includes a center axis and a through hole extending between the top surface and the bottom surface, and wherein the groove and the through hole are located on opposite or substantially opposite sides of the center axis of the member.

8. The metal cutting tool holder according to claim 6, wherein when the member is mounted in the cavity, a first end of the groove corresponds to the first end of the curved third fluid passage and a second end of the groove corresponds to the second end of the curved third fluid passage.

9. The metal cutting tool holder according to claim 8, wherein the first end of the groove corresponding to the first end of the curved third fluid passage has a concave bottom surface having a first radius, wherein the second end of the groove corresponding to the second end of the curved third fluid passage has a concave bottom surface having a second radius, wherein the first radius is larger than the second radius.

10. The metal cutting tool holder according to claim 1, wherein a diameter of the first fluid passage is larger than a diameter of the second fluid passage.

11. The metal cutting tool holder according to claim 1, wherein the first end of the curved third fluid passage has a larger cross-sectional area than the second end of the curved third fluid passage.

12. The metal cutting tool holder according to claim 1, wherein the first direction and the second direction are located in a common plane.

13. The metal cutting tool holder according to claim 1, wherein the tool holder body includes a coupling having a flange surface and a tapered surface symmetrically or substantially symmetrically arranged around a longitudinal center axis of the tool holder body, wherein the flange surface is perpendicular to the longitudinal center axis of the tool holder body, and wherein the first inlet intersects the flange surface.

14. The metal cutting tool holder according to claim 1, wherein the cavity includes a bottom surface and a side surface, and wherein each of the first outlet and the second inlet intersect the side surface of the cavity.

15. A method to machine a metal work piece by a turning operation comprising the steps of:
supplying a metal cutting tool holder according to claim 2;
fastening a turning insert in the insert seat;
supplying a metal work piece;
rotating the metal work piece;
supplying a fluid from the first inlet to the second outlet; and
moving the metal cutting tool holder relative to the metal work piece such that a cutting edge of the turning insert cuts chips from the metal work piece.

* * * * *